(No Model.)
E. G. HOFFMANN.
RUBBER TIRE FOR WHEELS.
No. 463,153. Patented Nov. 17, 1891.
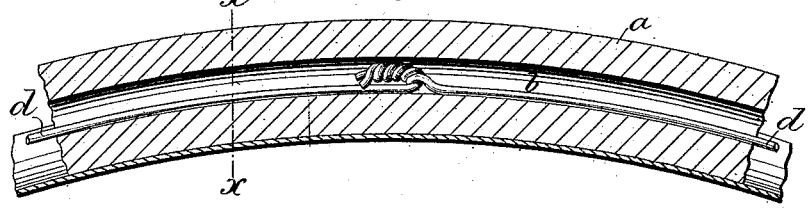
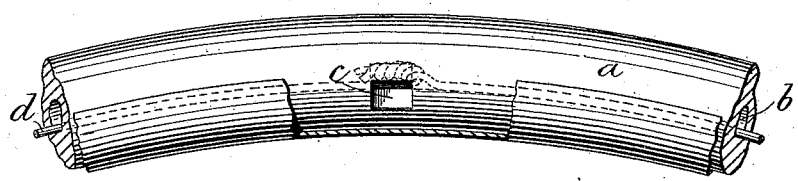
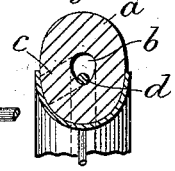
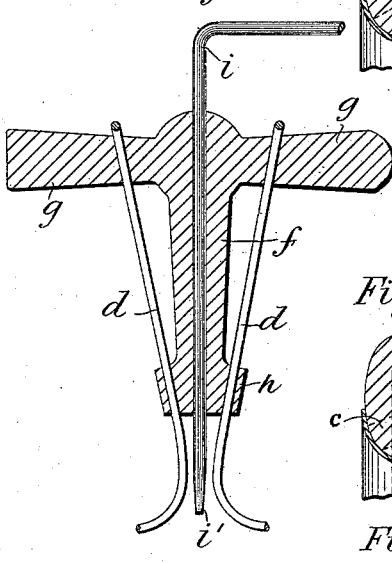
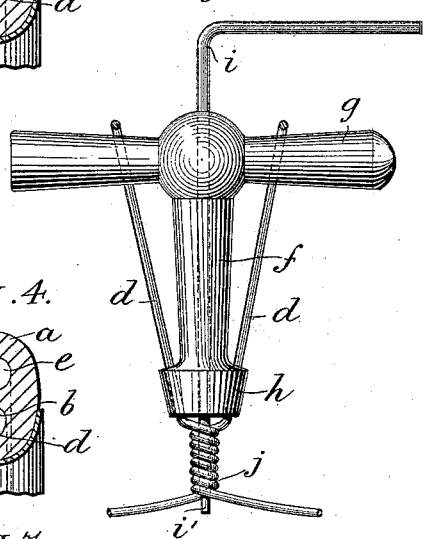
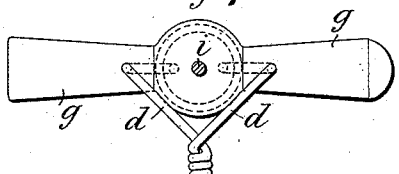
Witnesses.
Inventor:
E. G. Hoffmann,
by Foster & Freeman
Attys

UNITED STATES PATENT OFFICE.

ERNEST GUSTAV HOFFMANN, OF LONDON, ENGLAND.

RUBBER TIRE FOR WHEELS.

SPECIFICATION forming part of Letters Patent No. 463,153, dated November 17, 1891.

Application filed October 9, 1890. Serial No. 367,575. (No model.)

*To all whom it may concern:*

Be it known that I, ERNEST GUSTAV HOFFMANN, a subject of the German Emperor, residing at New Southgate, in the county of Middlesex, England, have invented a new and useful Improvement in Rubber Tires for Vehicles and Means for Securing Same on the Wheel, of which the following is a specification.

My invention relates to improvements in rubber tires for cycles and other vehicles and to means for securing same on the wheel.

To clearly explain the nature of my invention, I will describe it with reference to the accompanying drawings, in which—

Figure 1 is a longitudinal section of a portion of a cycle-tire, showing my method of fastening same. Fig. 2 is an elevation of same, a portion of the wheel-rim being broken away. Fig. 3 is a cross-section on line $x\ x$, Fig. 1. Fig. 4 is a cross-section of a modified form of tire. Fig. 5 is a sectional elevation of the tool I employ in securing the wire. Fig. 6 is an elevation of same, and Fig. 7 is a plan view.

The endless rubber tire $a$ I form with a hole $b$ through the center, and at one point leave an opening $c$ in same, as shown in Fig. 2, said opening being on its under side, so that when the tire is in place it will be covered by the rim of the wheel. Through this opening and through the center hole of the tire I thread a strong wire until its other end comes round, when I bring it through the opening $c$. The tire is then placed on the rim of the wheel and is turned slightly, so as to bring the opening $c$ upward and into view, when the two ends of the wire $d$ are securely twisted together, so as to tighten the tire and bind it firmly on the wheel. The twisted portion is then pushed into the tire through the opening and the tire is turned back into place. If desired, a little india-rubber solution may be placed between the tire and rim to further hold the former in place.

In Fig. 4 is shown an ordinary cushioned tire (having the usual cushioning-hole $e$ through same) to which I have applied my invention. In order to get the two holes throughout its length, the tire, instead of being round, is of elongated section and preferably has flattened sides.

I have found in twisting the ends of the wire $d$ together that they will frequently break, owing to one end twisting around the other, instead of the two twisting equally. To obviate this I employ the device represented in Figs. 5, 6, and 7, consisting of a shank $f$, having handles $g\ g$ at one end and a boss $h$ at the other. This boss $h$ has two holes therein, as shown, through which the two ends of the wire $d$ are passed as they project from the opening $e$ of the tire, while to temporarily secure them they are passed through two holes in the handles $g\ g$ and tightly twisted together beyond same, as shown in Fig. 7. The shank $f$ has a central hole, through which a hard-steel rod $i$ is passed, the point $i'$ of which may be slightly tapered, its end being allowed to project a short distance through the boss $h$. When the tool is twisted, the ends of the wire $d$ will be twisted regularly around the rod $i$ in even spirals or turns. When the wire is drawn up sufficiently tight to hold the tire, the rod $i$ is gradually withdrawn, so as to clear one or two of the spirals, and a partial turn is given to the tool to close up or lock tight the last spirals or coils at the point $j$, Fig. 6. The rod is then completely withdrawn and the remaining coils closed up by a turn or two of the tool, after which the ends of the wire may be nipped off and the tool removed.

What I claim, and desire to secure by Letters Patent, is—

The combination, with a rubber tire having a hole through its length for carrying a wire and a second hole for absorbing vibrations, of a wire threaded through the first hole, the ends of which are twisted together for the purpose of binding said tire to the wheel-rim, substantially as described.

In testimony whereof I have hereunto set my hand in the presence of two subscribing witnesses.

ERNEST GUSTAV HOFFMANN.

Witnesses:
PHILIP M. JUSTICE,
ALLEN N. IVES.